United States Patent [19]

Iwami

[11] Patent Number: 4,813,645
[45] Date of Patent: Mar. 21, 1989

[54] VEHICLE SEAT WITH SUSPENSION DEVICE

[75] Inventor: Kunihide Iwami, Akishima, Japan

[73] Assignee: Tachi-S Co., Ltd., Akishima, Japan

[21] Appl. No.: 41,776

[22] Filed: Apr. 23, 1987

[51] Int. Cl.$^4$ ............................................ F16M 13/00
[52] U.S. Cl. ..................................... 248/588; 248/429
[58] Field of Search ............. 248/588, 429, 430, 584,
248/595; 297/473, 485, 468; 296/65 R;
280/801, 804

[56] References Cited

U.S. PATENT DOCUMENTS

| | | | |
|---|---|---|---|
| 1,708,632 | 4/1929 | Podiebrad | 248/588 X |
| 3,519,240 | 7/1970 | Swenson | 248/586 X |
| 3,737,197 | 6/1973 | Hall | 297/468 |
| 3,758,158 | 9/1973 | Radke | 297/468 |
| 3,811,727 | 5/1974 | Rumpel | 297/468 |
| 3,977,725 | 8/1976 | Tengler | 297/468 |
| 4,025,110 | 5/1977 | Poorman | 297/468 |
| 4,042,276 | 8/1977 | Breitschwerdt | 280/801 |
| 4,482,188 | 11/1984 | Tilly | 280/801 X |
| 4,624,437 | 11/1986 | Sakamoto | 248/588 |
| 4,673,217 | 6/1987 | Nishiyama | 297/473 |

FOREIGN PATENT DOCUMENTS 2820589 11/1979 Fed. Rep. of Germany ...... 297/473
55-8957 1/1980 Japan .................... 297/473

Primary Examiner—J. Franklin Foss
Attorney, Agent, or Firm—Oldham & Oldham Co.

[57] ABSTRACT

In a vehicle seat with suspension device wherein the suspension device is provided between the seat and a floor of the vehicle and a belt anchor for seat belt is provided on the seat, there are arranged an engagement member of a U-shaped configuration on the lateral side of the seat and an engagement guide member on the upper frame of the suspension device such that the engagement member is halfway engaged with the engagement guide member, and further a connecting link piece between the upper and lower frames of the suspension device. With such structure, a pulling force exerted upon the seat belt is transmitted through the engagement member, engagement guide member and connecting link piece down to the floor of vehicle and received by the same.

5 Claims, 2 Drawing Sheets

VEHICLE SEAT WITH SUSPENSION DEVICE

BACKGROUND OF THE INVENTION

1. Field of the Invention

The present invention relates to a vehicle seat with suspension device, and in particular to a belt anchor mechanism for connection with a seat belt adapted to hold and restrain an occupant on the seat.

2. Description of the Prior Art

In some of vehicles, especially automobiles, a suspension device is provided between the seat and floor for the purpose of resiliently supporting the seat to absorb a vibration or shock caused in running on a bad road and so forth.

In most instances, a suspension device of this kind is of such a typical structure that X-shaped links are provided between an upper frame fixed on the bottom of a seat and lower frame fixed on the side of vehicle floor so that the upper frame is vertically movable via the X-shaped links relative to the lower frame, and a spring is extended between the X-shaped links and those frames, with a shock absorber being interposed between the upper and lower frames, whereby with this structure, suspension action is performed by virtue of the spring and shock absorber.

The seat provided with such suspension device has been with a problem as to a seat belt anchor thereon, in that the structure of the belt anchor involves a high possibility, when a great impact is applied, of causing a damage to the suspension device and of pulling the seat belt so strongly as to give an excessive pressure to an occupant on the seat. In other words, for example, in the case of the belt anchor fixed on the seat or the upper frame of the suspension device, when a collision accident occurs, a reaction force exerted by the occupant is directly transmitted to the suspension device, resulting in the breakage of the suspension device which may be a critical cause that the occupant will be thrown out. On the other hand, in the case of the belt anchor fixed on the side of vehicle floor, the vertical movement of the suspension device, even in driving on a normal road, causes undesired excessive fastening of the seat belt around the occupant.

In an attempt to solve the foregoing problem, there has been proposed a dual belt anchor structure consisting of a first belt anchor fixed on the seat or the upper frame of suspension device and a second belt anchor fixed on the side of vehicle floor, wherein the first belt anchor is connected with the second belt anchor via a second belt or link, so that, in a collision accident, a reaction force exerted by the occupant to the seat belt is transmitted and escaped to the vehicle floor.

However, the above-mentioned dual belt anchor structure employed in conventional seat with suspension device is found disadvantageous in its complexity due to the fact that the two belt anchors as well as the second belt or link are required for installation of a seat belt on the seat, and further has a shortcoming in that the second belt needs to be adjusted its length so as to be loosened, considering the stroke amount of vertical movement of the suspension device as well as the movement range of slide rails, and the degree of loosening of the second belt varies depending on different forward-/backward positions of the seat adjusted by the occupant, which makes the occupant feel uneasy about the unstable state of seat belt and hard to trust the seat belt in sitting on the seat.

SUMMARY OF THE INVENTION

It is a primary purpose of the present invention to provide an improved vehicle seat with suspension device which eliminates the above-discussed problems, whose structure is very simple, and which allows an occupant on the seat to be positively and safely held and restrained by a seat belt.

Particularly, the present invention is intended to achieve the foregoing purpose in connection with such vehicle seat with suspension device, of a type having slide rails associated with a seat adjusting device, and therefore, in accordance with the invention, upon the lateral portion of the seat is fixedly provided an engagement member so formed that it extends downwardly from a belt anchor to be connected with a seat belt and terminates in a hook-like bent lower end portion, while upon the upper frame of the suspension device, fixedly provided is an engagement guide member which is at its upper end portion engaged halfway with the engagement member, and further provided is a joint link between the upper and lower frames of the suspension device.

Accordingly, thus-formed structure of the invention comprises an engagement portion and joint portion, the former being essentially composed of such engagement member and engagement guide member and the latter being essentially of such connecting link, whereby when a great impact is applied due to a collision accident or the like, an occupant's reaction force caused thereby is exerted as a pulling load or pulling force on the seat belt, which is transmitted thorough the engagement portion including the belt anchor as well as through the linkage portion to the vehicle floor and received by the same, with the result that no direct influence of such pulling force is given to the suspension device, and the occupant is positively held and restrained to the seat.

DETAILED DESCRIPTION OF PREFERRED EMBODIMENTS OF THE INVENTION

Figure 1:
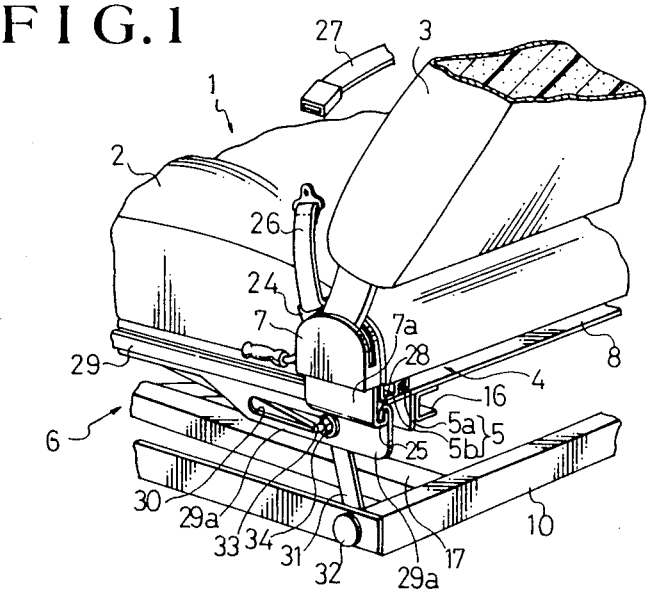
FIG. 1 is a perspective view showing the principal portion of a seat in accordance with the present invention.
Figure 2:
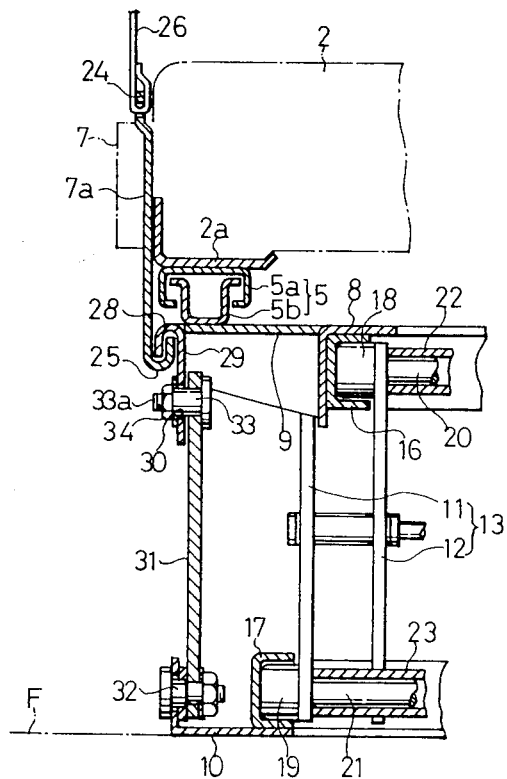
FIG. 2 is an enlarged, longitudinally sectional view of a belt anchor mechanism of the same seat in FIG. 1.
Figure 3:
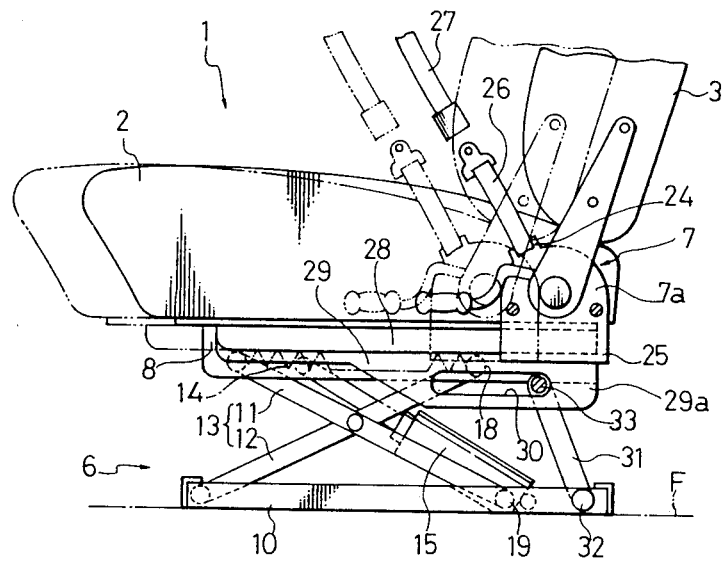
FIG. 3 is a partial side view of the seat in accordance with the seat in accordance with the present invention.
Figure 4:
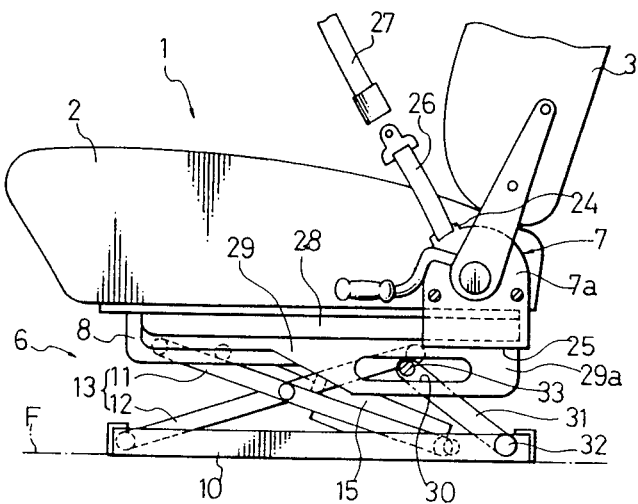
FIG. 4 is a partial side view of the same seat in FIG. 3, which is lowered.

By referring to the accompanying drawings, one embodiment of the present invention will be described hereinafter.

In the drawings, reference numeral (1) represents an automotive seat comprising a seat cushion (2) and a seat back (3). The seat (1) is supported on a suspension device (6) fixed on the floor (F) of an automobile, with a slide rail (5) of a seat adjusting device (4) being interposed between the bottom surface of the seat (1) and the upper portion of the suspension device (6).

The seat back (3) is connected with the seat cushion (2) though a reclining device (7) so that the seat back (3)

is adjustable as to its inclining angle relative to the seat cushion (2).

The slide rail (5) includes an upper rail (5a) fixed on the bottom surface of the cushion frame (2a) of the seat cushion (2) and a lower rail (5b) fixed on a bracket (9) is fixedly mounted on the lateral surface of the upper frame (8) of the suspension device (6).

The same way as in the conventional one, the suspension (6) is provided with an X-shaped link (13) between its upper and lower frames (8)(10), the lower frame (10) being fixed on the floor (F), wherein the X-shaped link (13) is formed by a pair of support link pieces (11)(12) which are pivotally connected with each other in a crossed fashion so that the upper frame (8) is supported in a vertically movable manner relative to the lower frame (10), and further provided with a tension coil spring (14) extended between one of those frames (for example, the upper frame (8)) and one of those link pieces (for example the link pieces (11) as well as with a shock absorber (15) interposed between the upper and lower frames (8)(10).

On the lateral frame sections of the upper frame (8) and lower frame (10), are respectively arranged upper and lower guide rails (16)(17) each having shaped configuration in section, in a longitudinal direction of such lateral frame sections. Pivotally provided on the respective movable-side end portions of the link pieces (11)(12), are guide rollers (18)(19), which are inserted rotatably within the respective guide rails (16)(17). The guide rollers (18)(19) respectively have shafts (20) (21) extending through corresponding joint tube members (22)(23) that join the link pieces (11)(12) with another pair of link pieces oppositely located thereto (not shown) in an interlocking manner, so that the guide rollers (18) (19) are synchronously rotatably connected with another pair of guide rollers (not shown) of such another link pieces.

In the present embodiment, a reclining device (7) is provided on the seat cushion (2), and has a base plate (7a) fixed to the seat cushion (2). The base plate (7a) is at its upper portion formed integrally with a belt anchor (24) and at its lower portion formed with a flange stopper portion (25) of a U-shaped configuration in section which extends so downwardly as to be disposed below the seat cushion (2), and constitutes an engagement member. A connecting belt (26) is fixedly secured to the belt anchor (24) and adapted to be engageable with the free end portion of a seat belt (27) which is adapted for holding and restraining an occupant on the seat. As with the currently available ones, the seat belt (27) has a base portion which is normally stored windingly in a retractor and is at its end fixed to the center pillar or where appropriate in the automobile.

Laterally of the upper frame (8) of the suspension device (6), a bracket (9) is provided, extending outwardly therefrom. On the outward end portion of the bracket (9), there is fixedly provided a guide bracket (29) such that it extends horizontally in a longitudinal direction of the upper frame (8) and has a reverse U-shaped flange stopper portion (28) formed therewith which is so arranged as to be halfway engaged with the aforementioned flange stopper portion (25) of the base plate (7a) in a vertical direction. The guide bracket (29) is formed with an enlarged portion (29a) at its rearward half portion, with a slide engagement hole (30) perforated longitudinally in the enlarged portion (29a). Thus, the guide bracket (29) constitutes an engagement guide member.

At the lateral side of and rearward portion of the lower frame (10), there is journalled a connecting link piece (31) by means of a stepped shaft pin (32) such that the connecting link piece (31) is free to rotate about the shaft pin (32) in a forward and backward direction of the lower frame (10). The free end portion of the connecting link piece (31) is fixedly provided with a engagement pin (33) which is inserted through the slide engagement hole (30) of the guide bracket (29) so that the pin (33) is slidable forwards and backwards within the engagement hole (30). The engagement pin (33) is at its threaded end portion (33a) engaged threadedly with a nut (34) so as to prevent the pin (33) from being fallen out of the slide engagement hole (30).

Now, the operation of the thus-constructed seat with suspension device of the present invention will be described as below.

In a normal state where an occupant sits on the seat (1) while driving the automobile without any trouble, is in a halfway engagement with the flange stopper portion (28) of the guide bracket (29) in such a manner that the respective ends of the flange stopper portions (25)(28) are in a slight abutment against the corresponding innermost curved or bent portion of the same. In other words, the reclining device (7) fixed on the seat (1) stands in a halfway engagement condition with respect to the suspension device (6). Accordingly, such halfway engagement allows the seat (1) to be movable forwardly and backwardly relative to the suspension device (6) through the slide rail (5) of the seat adjusting device (4), namely, the upper and lower rails (5a)(5b), whereupon the seat (1) is allowed to be adjustable forwardly and and backwardly by virtue of such slidable portion as the slide rail (5).

Next, after having adjusted the position of the seat (1) in a forward and backward direction, the occupant passes the seat belt (27) around his or her body and engages its free end portion with the belt anchor (24) so that he or she is held and restrained to the seat (1), and ready for driving the automobile.

While driving, when a collision accident or the like occurs, applying a great impact, a reaction force of the occupant caused thereby is exerted as pulling load or pulling force upon the seat belt (27), and due to such pulling force, the seat cushion (2) is about to be forced upwardly. At this time, however, the flange stopper portion (25) at the reclining device (7) is forcibly brought into a full engagement with the flange stopper portion (28) at the suspension device (6). Then, the rearward portion of the upper frame (8) of the suspension device (6) is also about to be forcibly moved upwards together with the seat cushion (2), but the fact that the upper frame (8) is in a linked connection with the lower frame (10) by means of the connecting link piece (31) hinders the upward movement of the upper frame (8) almost completely, with the result that the belt anchor (24) is in an unmoved state with respect to the floor (F) through both flange stopper portions (25)(28) and the connecting link piece (31), and thus the pulling force exerted on the seat belt (27) is transmitted to and and received by the floor (F), whereby the occupant is positively held and restrained to the seat (1) and protected safely.

In addition, the seat (1) is adjustable at any desired point in a forward and backward direction, with the flange stopper portion (25) at the reclining device (7) being retained in a halfway engagement with the flange stopper portion (28), and therefore, even when a great impact is applied, both flange stopper portions (25)(28) are positively brought into a full engagement with each other, regardless of the adjusted position of the seat (1). Also, the suspension device (6) is adjustable at any desired point in a vertical direction, with the link piece (3) being always engaged with the slide engagement hole (30), and as such, the link piece (3) ensures transmitting a pulling force of the occupant to the floor (F) without giving such troublesome loosening adjustment as found in conventional seat belt and wire and without any unreliable feeling about the loosened seat belt resulted therefrom. Accordingly, the occupant is held and restrained to the seat with much safety so that he or she is assured of safe restraint by the seat belt (27)

In the above-described structure of the present invention, it may be so arranged that the connecting link piece (31) is at one end portion thereof pivotally fixed at the side of the upper frame (8) of the suspension device (6) and at the other end portion thereof slidably engaged with a new slide engagement hole formed at the side of the lower frame (10) of the suspension device (6). It may also be arranged such that the belt anchor (24) and the flange stopper portion (25) are formed independently of the base plate (7a) of the reclining device (7) and fixed on the seat cushion (2), instead of being formed thereon, and the curved or bent configuration of the flange stopper portions (25)(28) may be modified in various ways.

From the above description, it is to be understood that, in accordance with the present invention, there are provided a vertically engageable, fore-and-aft slidable engagement member between the upper frame of the suspension device and the seat, and a connecting linkage between the upper and lower frames of the suspension device, whereby a pulling force exerted by a reaction of an occupant in a collision case or the like is transmitted through the engagement member and connecting linkage to the floor and received by the same, thereby permitting the occupant to be positively held and restrained to the seat and enhancing a safety for the occupant.

Further, since a connecting link piece is employed to substitute for a second belt anchor of the conventional dual seat belt structure, there is eliminated such loosening problem as mentioned above so that the occupant does not feel uneasy about the loosened state of the seat best or wire, or rather he or she is assured of reliability of the seat anchor mechanism.

What is claimed is:

1. A vehicle seat with a suspension device in which the suspension device has upper and lower frames, a seat adjusting device is interposed between the seat and suspension device, and a seat belt is provided on the seat, said seat comprising:
    a belt anchor fixed on a lateral side of said seat, said belt anchor being adapted to be connected with said seat belt;
    an engagement member fixed on the lateral side of said seat, said engagement member extending downwardly and having a lower end portion of a substantially U-shaped configuration;
    an engagement guide member fixed on an upper frame of said suspension device, with such an arrangement that said engagement guide member is at its upper portion engaged halfway with said engagement member; and
    a connecting link piece provided between said upper and lower frames of said suspension device such that a first end portion of said connecting link piece is pivotally connected to one of said upper and lower frames,
    an elongated engagement hole formed in the other one of said upper and lower frames in which a second end portion of said connecting link piece is slidably engaged,
    whereby, when a pulling load is exerted upon said seat belt, causing said engagement member and engagement guide member to be brought to a full engagement with each other, the pulling load is transmitted through an engaged portion of said engagement and engagement guide members as well as through said connecting link piece, to a floor side of the vehicle and received thereby.

2. The vehicle seat according to claim 1, wherein there is provided a slide rail between a bottom surface of said seat and said suspension device, wherein a reclining device is fixed on a seat cushion of said seat, said reclining device having a base plate, the arrangement of said base plate being such that its upper portion is fixedly provided with said belt anchor while its lower portion is formed with said engagement member which is bent or curved in a substantially U-shaped configuration, and where in said first end portion of said connecting link piece is rotatable in a forward and backward direction and said second end portion of said connecting link piece is movable in a forward and backward direction.

3. The vehicle seat according to claim 2, wherein said substantially U-shaped engagement member is in a slidable engagement with said engagement guide member so that said engagement member is movable in a longitudinal direction of said engagement guide member.

4. The vehicle seat according to claim 1, wherein said suspension device comprises an upper frame fixed to said slide rail disposed thereabove, a lower frame fixed to said floor of vehicle, and an X-shaped link provided between said upper and lower frames, said X-shaped link comprising at least two support link pieces such that they are pivotally connected to each other in a crossed manner, and wherein there is extended a tension coil spring between one of said upper and lower frames and a movable-side end portion of one of said support link pieces.

5. The vehicle seat according to claim 1, wherein said engagement guide member is fixed on a lateral side of said upper frame of said suspension device, extending horizontally in a longitudinal direction of said upper frame, said engagement guide member having an enlarged portion formed in its rearward half portion in which said elongated engagement hole is formed extending in a longitudinal direction of said enlarged portion.

* * * * *